United States Patent [19]

Arnold

[11] Patent Number: 4,943,959
[45] Date of Patent: Jul. 24, 1990

[54] DATA PACKET SWITCHING

[75] Inventor: John S. Arnold, Northants, England

[73] Assignee: Plessey Overseas Limited, Ilford, England

[21] Appl. No.: 308,520

[22] Filed: Feb. 10, 1989

[30] Foreign Application Priority Data

Feb. 10, 1988 [GB] United Kingdom ............... 8802999

[51] Int. Cl.⁵ .............................................. H04J 3/26
[52] U.S. Cl. .................................. 370/85.5; 370/85.4;
370/85.6; 340/825.5
[58] Field of Search ................... 370/89, 86, 90, 94,
370/60, 85.4, 85.5, 85.6, 94.1; 340/825.05,
825.5, 825.51

[56] References Cited

U.S. PATENT DOCUMENTS 4,482,999  11/1984  Janson et al. ......................... 370/60
4,602,365  7/1986  White et al. .......................... 370/89
4,680,757  7/1987  Murakami et al. .................... 370/89
4,726,018  2/1988  Bux et al. ............................. 370/89
4,736,368  4/1988  Szczepanek .......................... 370/89

Primary Examiner—Douglas W. Olms
Assistant Examiner—Alpus H. Hsu
Attorney, Agent, or Firm—Fleit, Jacobson, Cohn, Price, Holman & Stern

[57] ABSTRACT

A data packet switching arrangement wherein data packets are switched into a transmission pathway according to their priority. Data packet priority is consequently determined in a ring and a priority token attributed thereto. A high priority token ensures its data packet is switched into the transmission pathway when next available. Lower priority tokens are held by respective packets until all data packet priorities have been determined and no higher priority tokens attributed, whereupon the respective data packet is switched into the transmission pathway when next determined.

5 Claims, 3 Drawing Sheets

NOTE 1 IN THESE CASES THE DEVICE WILL RELEASE T1 AND T2 TOGETHER

| PRIORITY (P) P1 HIGH PRIORITY P2 LOW PRIORITY | OLD STATE S0 S1 S2 S3 | TOKENS IN T1 T2 | NEW STATE S0 S1 S2 S3 | TOKENS OUT T1 T2 | |
|---|---|---|---|---|---|
| 2 | ✓ | 0 0 | ✓ | 0 0 | |
| 2 | ✓ | 0 1 | ✓ | 0 1 | |
| 2 | ✓ | 1 0 | ✓ | 1 0 | |
| 2 | ✓ | 1 1 | ✓ | 1 1 | |
| 2 | ✓ | 0 0 | ✓ | 0 0 | |
| 2 | ✓ | 0 1 | ✓ | 0 0 | |
| 2 | ✓ | 1 0 | ✓ | 1 0 | |
| 2 | ✓ | 1 1 | ✓ | 1 0 | |
| 2 | ✓ | 0 0 | ✓ | 0 0 | |
| 2 | ✓ | 0 1 | ✓ | 0 0 | ERROR 2 |
| 2 | ✓ | 1 0 | ✓ | 0 0 | |
| 2 | ✓ | 1 1 | ✓ | 0 0 | ERROR 2 |
| 2 | ✓ | 0 0 | ✓ | 0 0 | |
| 2 | ✓ | 0 1 | ✓ | 0 0 | ERROR 2 |
| 2 | ✓ | 1 0 | ✓ | 0 0 | ERROR 1 |
| 2 | ✓ | 1 1 | ✓ | 1 1 | ERROR 1; ERROR 2 |
| 1 | ✓ | 0 0 | ✓ | 0 0 | |
| 1 | ✓ | 0 1 | ✓ | 0 1 | |
| 1 | ✓ | 1 0 | ✓ | 1 0 | |
| 1 | ✓ | 1 1 | ✓ | 1 1 | |
| 1 | ✓ | 0 0 | ✓ | 0 0 | |
| 1 | ✓ | 0 1 | ✓ | 0 1 | |
| 1 | ✓ | 1 0 | ✓ | 0 0 | |
| 1 | ✓ | 1 1 | ✓ | 0 0 | |
| 1 | ✓ | 0 0 ERROR 3 | ✓ | 0 0 | |
| 1 | ✓ | 0 1 ERROR 3 | ✓ | 0 1 | |
| 1 | ✓ | 1 0 ERROR 3 | ✓ | 0 0 | |
| 1 | ✓ | 1 1 ERROR 3 | ✓ | 0 0 | NOTE 1 |
| 1 | ✓ | 0 0 | ✓ | 0 0 | |
| 1 | ✓ | 0 1 | ✓ | 0 0 | NOTE 1 |
| 1 | ✓ | 1 0 | ✓ | 0 0 | ERROR 1 |
| 1 | ✓ | 1 1 | ✓ | 0 0 | ERROR 1; NOTE 1 |

| ERROR 1 = DUPLICATE T1 | S0 = QUIESCENT |
|---|---|
| 2 = DUPLICATE T2 | S1 = READY |
| 3 = FAULT IN DEVICE | S2 = STEADY |
| | S3 = GO |

FIG. 6.

DATA PACKET SWITCHING

The present invention relates to data packet switching.

When a number of independent devices need to write to a common data bus it is necessary to provide means to equitably share the bus capacity between the devices. Devices having data to send on the bus will contend for access and the means for choosing which should gain access is referred to as contention resolution.

In many cases the group of devices having access to a bus will include some which have a higher priority of access and should have first choice in use of the bus. In some situations more than two levels of priority may be required in which case access should be ordered according to the priority levels.

Previous mechanism have had contention resolution on the common transmission bus, i.e. one I/O port only per device which taps onto a common contention resolution path. This form of contention resolution must always suffer from a fixed order of priority (e.g. determined by the source address) or on an uncertainty (e.g. who gives up first or who has the faster clock). Ring (loop or 'daisy chain') contention resolution, where the devices are arranged in an ring about the bus, substantially removes the above defects. When the device has finished, the next device in the loop gets first chance and so on.

An example of such a mechanism is given in United Kingdom Pat. No. 1,250,352 (Suensha Handelsbonken).

It is an objective of the present invention to provide a data packet switching arrangement wherein a multitude of priority levels for data packets can be attributed whereby device positional anomalies are substantially relieved and general transmission efficiency improved.

According to the present invention, there is provided a data packet switching arrangement for switching data packets into a transmission pathway including means arranged to determine data packet priority and to attach a priority token thereto, there being a single high priority token attachable to a data packet to ensure that packet is next to be switched into the transmission pathway, and lower priority tokens attachable to respective data packets in order and, there being no tokens of higher priority extent, are switched into the transmission pathway in said order, and upon a data packet being switched into the transmission pathway, its priority token is released.

An embodiment of the present invention will now be described by way of example only with reference to the accompanying drawings, in which.

Figure 2:
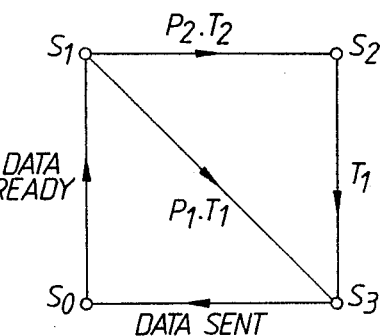
FIG. 2 is a state diagram for the access device arrangement as shown in FIG. 1 having N levels of priority for data packets.
Figure 5:
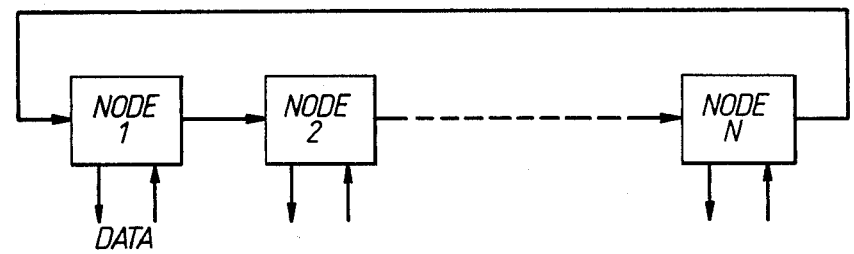

FIG. 5 illustrated, in block diagram form, an access device arrangement in multiplexed operation with the transmission pathway being a unidirectional ring; and FIG. 6 is a table of error conditions for an arrangement as shown in FIG. 2.

Figure 1:
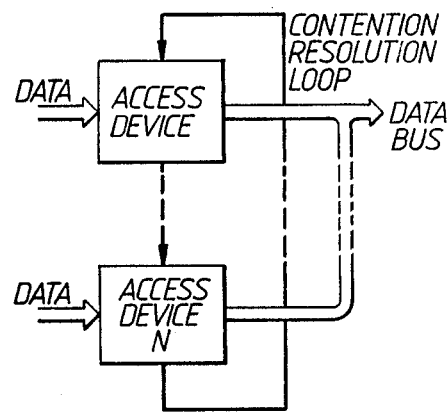
FIG. 1 illustrates an access device arrangement according to the present invention.

Consider FIG. 1 The mechanism for contention resolution is based upon a contention loop 1 passing through all the access devices. The loop carries N distinguishable tokens where N is the number of priority levels required. There is only one set of N tokens in the loop at any time and each of the tokens has a different significance. One or more tokens may be held temporarily by a device. The relationship between this action, the state of the device and the required priority of access will be described in terms of two priority levels of access.

A state diagram for contention resolution at a device is given in FIG. 2 where there are two levels of priority. If we assume that the data input is broken into conveniently sized packets, the packets need not all be the same size but do need to have a maximum size in order to avoid one device holding the data bus unduly long and hence denying access from other devices. Possession of the right combination of priority tokens by a device conveys the authority to transmit one packet of data on the common data bus. A device may not hold a token if it does not already have data ready to transmit.

The quiescent state for a device contending port is S0. In this state a device simply passes tokens received on to the next device in the contention resolution loop 1. When a complete packet of data has been received, the device state changes to S1. If the device or packet has the higher priority (P1) then it will wait for and hold the higher priority token T1, it can then transmit the packet and release the token T1. In some system configurations where the data packet on the bus is preceded by a busy/free indication, the token can be passed on whilst the packet is being transmitted; in this case the device has to wait for the current packet to end before transmitting the waiting packet (i.e. instead of the token meaning 'go', it means 'you're next').

If the device or packet has the lower priorty (P2), it will first seize and hold T2, moving to state S2 but will not transmit on the bus until it also holds T1 (S3). It may not seize T1 and T2 at the same time. This procedure ensures that all waiting packets in the contention resolution bus having the higher priority P1 will have had a prior opportunity to transmit on the bus. In order to ensure this, a device with P1 access (only requiring T1) will also hold T2 and release the two tokens together, otherwise the tokens may become detached and permit P2 access before all the devices have had an opportunity for P1 access.

It will be appreciated that there are within the ring several devices with P1 and P2 priority demanding access to the transmission path at the same time.

A device requiring P1 access ignores T2 but grabs and holds T1. If T2 is available after it has got T1 but before it has finished transmitting then the device holds T2 as well. When the device is finished it releases T1 then T2.

A device requiring P2 access ignores T1 but grabs and holds T2. Only when it holds T2 can it grab and hold T1 and only then can it access the data bus. When finished it releases T1 and T2 together.

It will be seen that a low priority device cannot use the data bus until any other device in the loop with high priority has had a chance to use it.

A practical embodiment of the invention could be a single dedicated wire loop with asynchronous logic between the ports in contention of the device. A single pulse circulates in the loop, the rising edge represents $T_1$ and the falling edge $T_2$.

A device requiring $P_1$ access, on detecting a low/high transition ($T_1$) will hold the output low (i.e. 'holds' the token) and uses the bus. If it detects a high/low transition before completion, it leaves the output low (i.e. now 'holding' $T_1$ and $T_2$) and transmit low/high ($T_1$)-pause-high/low on completion. If it does not detect a high/low transition before completion, it transmits low/high ($T_1$) on completion.

A device requiring $P_2$ access, on detecting a high/low ($T_2$) will hold the output high (i.e. 'holds' $T_2$). On detecting a low/high ($T_1$) it uses the bus. On completion it transmits high/low ($T_2$)-pause-low/high($T_1$). Since, in case of using transitions to indicate tokens, the two tokens represented by the low/high and high/low transition cannot be transmitted together they must be released spaced by a short pause. However, in order to ensure that out-of-turn $P_2$ access does not occur in following devices, both tokens need to be released "together" as described previously. For this case therefore, "together" is defined as being within a short timer period where the period length is greater than that of the pause introduced on release of the tokens.

With such a dedicated signal wire, untimed or 'self-timed' operation is possible. This has the advantage that the propagation delay of tokens through the nodes is minimised because the logic works at its ow best speed instead of at the speed of an external clock, where the clock interval is set by 'worst case' propagation delays.

In this case, it is necessary to guard against the possibility of cumulative and variable propagation delays resulting in the interval between the two edges of the signal, in either direction, reducing to zero. This is achieved by providing a delay circuit in each node which ensures a minimum interval between positive and negative edges and between negative and positive edges of the outgoing signal. The effect on the contention signal loop as a whole is to set the minimum interval between edges to that of the node with a delay circuit at the upper end of its tolerance range.

An alternative embodiment of the present invention is in a bit multiplexed system with other data on a common communication data bus. However, this requires the signals to be timed.

Multiplexing is most suited to the case where a number of nodes are contending for access to a common transmission medium or data bus which may be undirectional ring or the transmit end of a communication path.

The contention signal is represented by a single bit occurring regularly on the common serial medium at a known location. The uninterrupted repetition of a single state is interpreted as the continued presence of that state.

Figure 3:
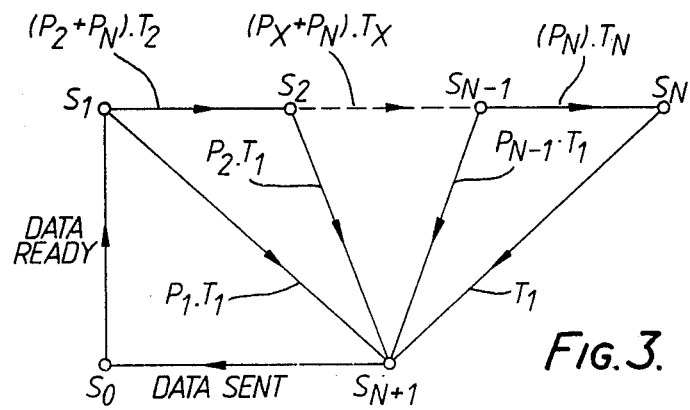
FIG. 3 is a state diagram for the access device arrangement as shown in FIG. 1 having N levels of priority for data packets.

In FIG. 3 a state diagram is illustrated for an arrangement having N levels of priority access using N tokens. The operation of the FIG. 3 arrangement is similar that shown in FIG. 2. Devices having the highest priority grab the highest priority token T1 and hold the lower priority tokens T2, T3 ... TN if they are available until its data has been transmitted. Devices having the second highest priority grab the T2 priority token and holds lower priority tokens if they are available T3 ... TN, the highest priority token T1 being passed on to the next device in the ring. The regime is similar for the remaining tokens.

Figure 4A:
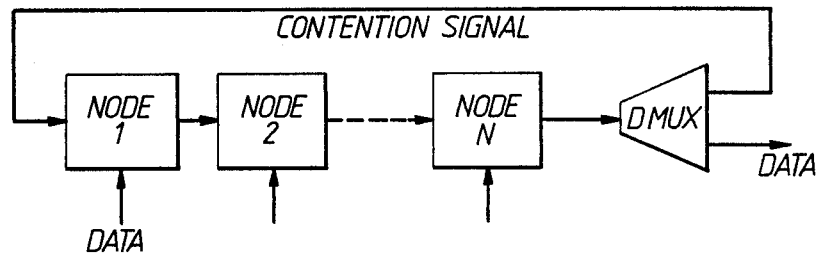
FIG. 4a and 4b illustrates, in block diagram form, an access device arrangement in multiplexed operation with the transmission pathway being a transmit end of a communication link.
Figure 4B:
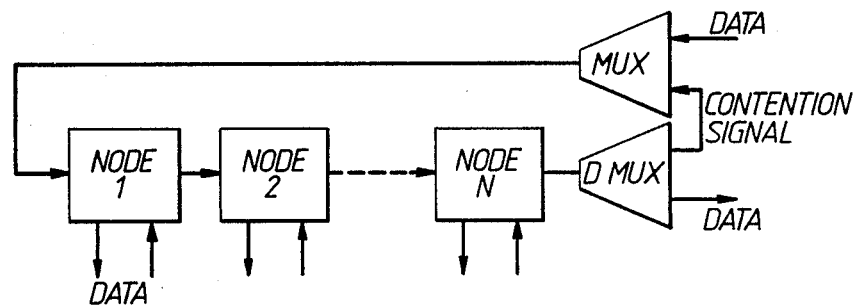

The case of the transmit end of a communication path is shown in FIG. 4a and 4b. Data is propagated unchanged across each node, although a node having established access may add to that data. The contention signal bit is dealt with by the contention resolution logic in the node as previously described. The contention signal and the data can be considered as quite separate communications which happen to be carried on the same bus. In order to avoid the continuous cycling of the same data, the transmit terminal equipment may separate the two communications, transmitting the data and looping back the contention signal to the first node. In some architectures where new data simply overwrites old then this special provision may not be necessary.

The case of a unidirectional ring is shown in FIG. 5. In this case data is both received and transmitted at each node with the contention signal handled as before. Data may be deleted at the receiving node or simply left and overwritten at a transmitting node with established access, according to the ring protocols adopted.

For a unidirectional ring, the possibility also exists of multiplexing several communication path, each with its own contention signal, on the same bearer. This type of ring is sometimes referred to as a 'slotted ring'.

Certain conditions, identified in FIG. 6, are error conditions. Error (1) implies that there is more than one T1 in the contention resolution loop and the device should delete the one detected. Error (2) implies that there is more than one T2 in the loop and the one detected should be detected. Error (3) implies that the device itself has made an error since it cannot be in state S2 with P1 access.

Action by the devices on Errors 1 and 2 will ensure that double access will be eliminated although a soft error in the contention resolution loop may result in a message being damaged by dual access before correction. This combined probability will be very small and unlikely to cause problems.

A soft error in the contention resolution loop may result in one or more tokens being lost. To cover this case and provide for start-up, each device will, for each token, time the interval between successive arrivals. If the period exceeds the time required for each device in the loop to transmit one packet then the device will introduce a new token. Since all devices will be timing the interval it may be that multiple tokens be added; in this case the surplus tokens will be removed by the error conditions described above.

It will be appreciated that the communication path or bus may be a time slot in a time division multiplexed (TDM) system or a fixed wire cable. Furthermore it will be noted that the T1 token can be passed around the ring independently while T2 tokens must be transmitted in packets associated with T1 tokens.

It will be further appreciated that the data bus may be any transmission pathway.

I claim:

1. A data packet switching arrangement for switching data pockets into a transmission pathway including means arranged to determine data packet priority in each of a plurality of contending input ports and assign priority tokens indicative of the data packet's relative priority, each contending input port being coupled to other contending input ports to form a contention path, said contention path being arranged to allow said priority tokens to be looped through each of said contending input ports, there being a distinctive priority token indicative of each relative level of priority, said distinctive priority token being seized and held by one contending input port when said one contending input port contains a data packets of said level of priority awaiting transmission, said distinctive priority tokens of higher level being arranged to be seized when these higher priority level tokens have been looped around said contention path and held when the data packet is transmitted and where tokens of lower priority which may arrive before completion in any transmission sequence and after the first token is seized, are also seized and held and where, on completion, all tokens held are released together.

2. A data packet switching arrangement as claimed in claim 1 wherein there is a high level priority token and a low level priority token, said high level priority token being represented by a low to high transition of a signal whilst said low level priority token is represented by a high to low transition in said signal, said high level priority token and said low level priority token, when held by one of said contending input ports, being released back to said contention path when said contention port's data packet is completely transmitted.

3. A switching arrangement as claimed in claim 1 wherein the transmission pathway comprises a timeslot in a time division multiplexed (T.D.M) communication system.

4. A switching arrangement as claimed in claim 1 wherein the transmission pathway comprises a fixed cable.

5. A switching arrangement as claimed in claim 1 wherein a predetermined time slot for trasmission of a data packet is provided.

* * * * *